(12) United States Patent
Honeyman

(10) Patent No.: US 6,172,431 B1
(45) Date of Patent: Jan. 9, 2001

(54) VEHICLE ENTRY TRANSMITTER WITH CONFORMABLE SWITCH TIP

(76) Inventor: Ewen Honeyman, Fordy Brook Farm Ford Lane East Hendred, Wantage Oxfordshire, OX12 8JX (GB)

(*) Notice: Under 35 U.S.C. 154(b), the term of this patent shall be extended for 0 days.

(21) Appl. No.: 09/313,846

(22) Filed: May 18, 1999

(51) Int. Cl.$^7$ .................................................. B60R 25/10
(52) U.S. Cl. ...................... 307/10.2; 180/287; 340/426; 340/825.31
(58) Field of Search .................. 307/10.2, 119, 307/139; 178/19.04; 180/287; 34/426, 825.72, 825.31; 73/866.5; 324/445, 446

(56) References Cited

U.S. PATENT DOCUMENTS

| | | |
|---|---|---|
| Re. 29,341 | 8/1977 | Peters et al. |
| 4,280,119 | 7/1981 | May . |
| 4,584,444 | 4/1986 | Nagashima . |
| 4,628,400 | 12/1986 | Ho . |
| 5,138,118 | 8/1992 | Russell . |
| 5,204,672 | 4/1993 | Brooks . |
| 5,373,118 | * 12/1994 | Watson .............................. 178/19.07 |
| 5,616,966 | * 4/1997 | Fischer et al. ...................... 180/287 |
| 5,627,529 | * 5/1997 | Duckworth et al. ............ 340/825.72 |
| 5,787,366 | 7/1998 | Adams . |
| 5,796,827 | 8/1998 | Coppersmith et al. . |
| 5,904,444 | * 5/1999 | Zimmer .............................. 340/825.3 |
| 6,002,387 | * 12/1999 | Ronkka et al. ...................... 345/157 |

FOREIGN PATENT DOCUMENTS 2290435    9/1998   (GB) .

* cited by examiner

*Primary Examiner*—Albert W. Paladini
(74) *Attorney, Agent, or Firm*—Schmeiser, Olsen & Watts

(57) ABSTRACT

The present invention provides an improved vehicle entry transmitter that can be used as a transmitter to lock and unlock vehicle doors, turn an alarm on and off, and/or disable and enable the vehicle. The present invention provides a vehicle entry transmitter that uses a contact switch/probe tip combination (referred to a "switch tip" in this application). When the switch tip is pressed against a vehicle the switch is activated and the vehicle entry transmitter sends a control signal through the switch tip and into the vehicle, where it can be picked up by a receiver. The receiver can then lock/unlock vehicle doors, turn an alarm on/off, and/or disable/enable the vehicle. In the preferred embodiment, the switch tip comprises a conformable and conductive material. When the switch tip is pressed against a vehicle, the conformable and conductive material deforms until the contact switch is activated, causing a control signal to be propagated through the conformable and conductive tip and into the vehicle.

16 Claims, 4 Drawing Sheets

VEHICLE ENTRY TRANSMITTER WITH CONFORMABLE SWITCH TIP

BACKGROUND OF THE INVENTION

1. Technical Field

The present invention relates generally to signal transmission and, more specifically, to keyless entry devices for vehicles.

2. Background Art

Remote electronic transmitters are commonly used for many applications to transmit codes or other control signals to receiving units. One common application has been in keyless entry devices, small hand-held transmitters used to lock and unlock vehicles and/or control vehicle security systems. These transmitters allow a person to easily lock the doors, turn on an alarm, and/or disable the vehicle by transmitting an appropriate signal to a receiving control unit. Likewise, these transmitters allow a person to unlock the doors, turn off the alarm, and/or enable the vehicle by transmitting an appropriate signal to the receiving control unit. These transmitters thus have the advantage of allowing easy access to the vehicle and improved control over any alarm and disabling system.

In the past these transmitters have used infrared, radio frequency, or other wireless transmission techniques to transmit the control signal from the keyless entry device to the receiving control unit. Unfortunately, by broadcasting these control signals they become available to other receivers. Thieves can thus use their own receivers to discover the transmitted control signal, and then use their own transmitter to transmit the control signal and unlock the doors, turn off the alarm, and/or enable the car.

This technique, often referred to as "grabbing" or "snooping", has become so widespread that a great deal of effort has been put into "anti-grabbing" protection devices. Such devices have included the use of algorithmic code encryption as well as code rejection techniques. Unfortunately, these techniques have not proven to totally effective in preventing grabbing. Thus, these arrangements continue to suffer from the disadvantage that the control signal is transmitted in a way that is detectable by other remote receivers.

Another technique for preventing grabbing was described in Great Brittan Patent No. 2 290 435, entitled "Signal Transmission System." This patent describes a method of transmitting a signal through an electrically conductive probe to a receiver circuit on the automobile. The conductive probe is selected to be substantially non-radiative, meaning that the probe will only transmit to the receiver through when the probe is proximate a conductive body (e.g. the automobile body) connected to the receiver. Because the signal is not transmitted as a radiative radio frequency signal it is not available to be grabbed by other receivers. Thus, the system described in this patent provides a transmission system that overcomes the disadvantages of the previous systems.

One disadvantage with this system is the difficulty in using the signal transmitting probe. The transmitting signal probe described in this patent is a metal tipped device. To effectively use this device, a person must hold the metal tipped probe against the car. Unfortunately, it is difficult to make an effective electrical contact with the metal tipped probe. The metal tip on the probe has a tendency to "bounce" off the metal car body and thus it is difficult to maintain a consistent conductive path to the receiver on the car. This is primarily because the metal probe is restricted in shape and cannot conform to uneven surfaces. This results in a relatively small contact surface area between the metal tipped probe and the car, reducing the conductivity of the contact between the metal tipped probe and the car. Additionally, the small size of the contact area means that metal tipped probe must be placed directly against a metal portion of the car, something that can be difficult with modern cars that make significant use of plastics and other non-conductive materials. The results is that a user may have to make multiple attempts before the control signal is received. This can annoy the user and waste the transmitter's power. Thus, while the system disclosed in this patent reduces the problems of code grabbing, there remains implementation difficulties.

Thus, there remains a need for improved vehicle entry system that reduces the problems of code grabbing while providing consistent performance and ease of use.

DISCLOSURE OF INVENTION

Accordingly, the present invention provides an improved vehicle entry transmitter that overcomes the limitations of the prior art. The improved vehicle entry transmitter can be used as a transmitter to lock and unlock vehicle doors, turn an alarm on and off, and/or disable and enable the vehicle. The present invention provides a vehicle entry transmitter that uses a contact switch/probe tip combination (referred to a "switch tip" in this application). When the switch tip is pressed against a vehicle the switch is activated and the vehicle entry transmitter sends a control signal through the switch tip and into the vehicle, where it can be picked up by a receiver. The receiver can then lock/unlock vehicle doors, turn an alarm on/off, and/or disable/enable the vehicle.

In the preferred embodiment, the switch tip comprises a conformable and conductive material. When the switch tip is pressed against a vehicle, the conformable and conductive material deforms until the contact switch is activated, causing a control signal to be propagated through the conformable and conductive tip and into the vehicle.

The conformable and conductive switch tip of the preferred embodiment has several advantages. First, because it is activated by pressing the switch tip against the car, it can be easily operated with one hand. Second, the conformable and conductive switch provides a good conductive path to the car. This is because the conforming nature of the switch tip increases the contact surface area between the car and the probe tip. In fact, the increased contact surface area can improve conductivity enough to allow the control signal to propagate by capacitive coupling through a small thickness of non conductive material, such as paint. Third, because the signal is transmitted at the exact moment that good conductive path is established (i.e., when the switch tip is pressed against and conforming to the surface of the car), the signal "spike" created by the switching turning on is guaranteed to pass into the car, increasing the probability that the receiver will receive the signal. Fourth, because the transmitter is only on when contacted to the car, battery power is conserved. Fifth, the conformable switch tip has less potential than a metal tipped probe to damage the finish on the car.

The foregoing and other advantages and features of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements.

BEST MODE FOR CARRYING OUT THE INVENTION

The preferred embodiment of the present invention provides an improved vehicle entry transmitter that uses a contact switch/probe tip combination (referred to a "switch tip" in this application). When the switch tip is pressed against a vehicle the switch is activated and the vehicle entry transmitter sends a control signal through the switch tip and into the vehicle, where it can be picked up by a receiver. The receiver can then lock/unlock vehicle doors, turn an alarm on/off, and/or disable/enable the vehicle.

In the preferred embodiment, the switch tip comprises a conformable and conductive material. When the switch tip is pressed against a vehicle, the conformable and conductive material deforms until the contact switch is activated, causing a control signal to be propagated through the conformable and conductive tip and into the vehicle.

Figure 1:
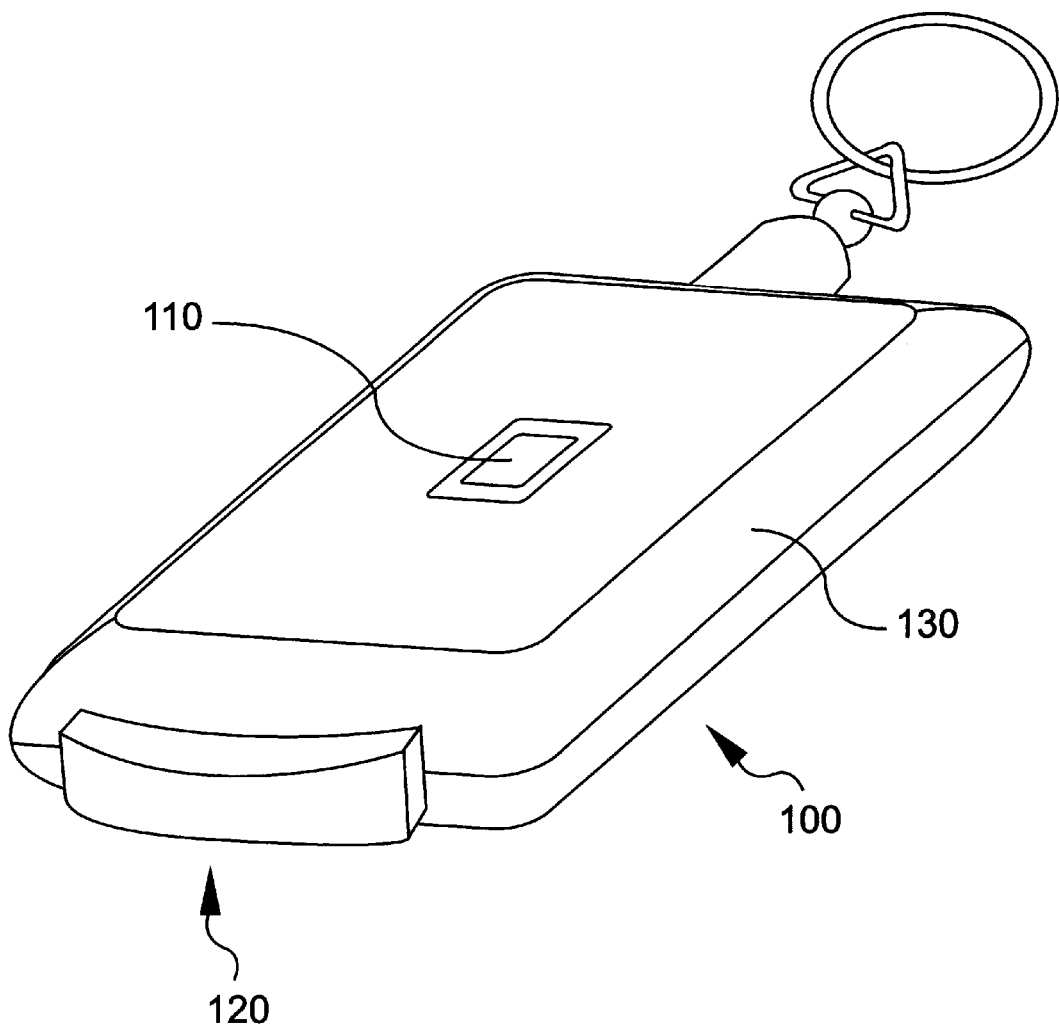
FIG. 1 is a perspective view of a vehicle entry transmitter having a switch tip in accordance with the preferred embodiment.

Turning now to FIG. 1, a preferred embodiment vehicle entry transmitter 100 is illustrated. The vehicle entry transmitter 100 includes a body 130, a control button 110 and a switch tip 120. As with other keyless entry devices, the vehicle entry transmitter 100 is preferably sized to be easily carried and attached to a key chain.

At the outset it should be noted that the preferred embodiment transmitter 100 can be used to transmit any type of control signal to an appropriate receiver on the vehicle, and that it can thus be adapted for a wide variety of functionality. For example, the transmitter 100 could be used as a "keyless entry transmitter" that transmits a control signal to lock and unlock the vehicle doors. The transmitter 100 could also be used as to activate a vehicle security system. In this case the transmitter 100 would transmit a control signal to turn on (or off) an alarm. The transmitter 100 could also disable (or enable) the a vehicle itself, typically by interacting with a cars computer control system. The transmitter 100 could also have other functions, such as unlocking a trunk, rolling up or down windows, etc. In all of these cases, the transmitter 100 sends an appropriate control signal through the switch tip 110, into the vehicle, where it can be picked up by a receiver in the vehicle. The receiver then performs the appropriate action (e.g., locking the doors, setting an alarm, disabling the car, etc.). Thus, in this application the term "vehicle entry transmitter" is meant to include transmitters to all of these and other equivalent types of systems.

The vehicle entry transmitter 100 transmits through the switch tip 120 when switch tip 120 is pressed against a conductive body, such as an automobile body. The control signal thus passes directly (or through capacitive coupling) from the switch tip 120 to the conductive body. The control signal can then be received by a receiver that is on the vehicle and electrically connected to the conductive body. The preferred embodiment thus uses a transmission and receiving mechanism similar to that disclosed in Great Brittan Patent No. 2 290 435, entitled "Signal Transmission System". Additionally, the vehicle entry transmitter preferably transmits in a substantially non-radiative manner, meaning that other receivers not connected directively to conductive body cannot receive the transmitted signal. Thus, it is preferable that the vehicle entry transmitter does not broadcast the signal as a radiative radio frequency signal, infrared or other wireless signal that can be easily received by remote receivers.

Figure 2:
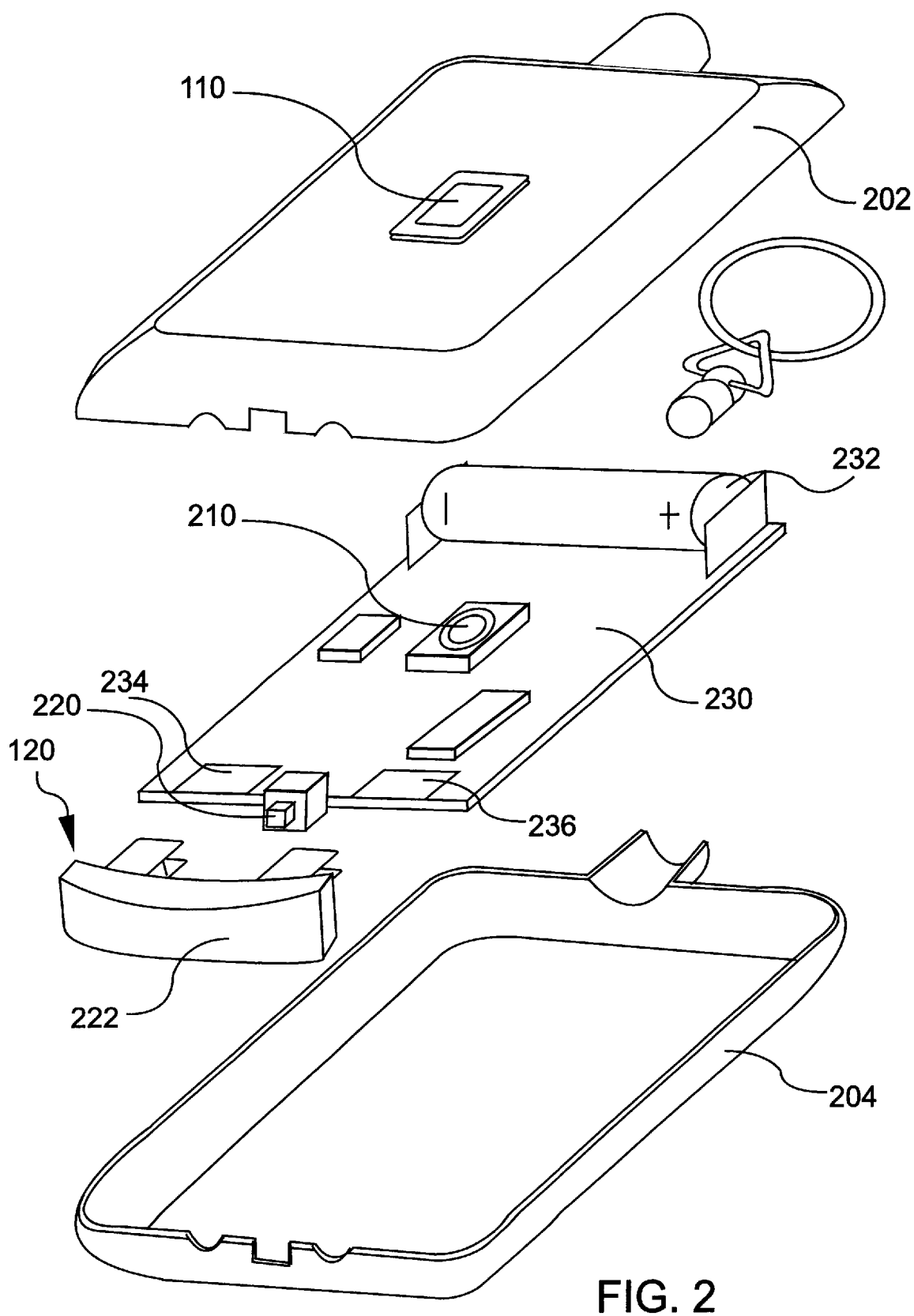
FIG. 2 is an exploded view of a vehicle entry transmitter having a switch tip in accordance with the preferred embodiment.

Turning now to FIG. 2, an exploded view of vehicle entry transmitter 100 is shown. In the preferred embodiment, the vehicle entry transmitter 100 includes four main parts, a first body half 202, a second body half 204, a transmitter circuit board 230 and a conductive tip 222. The first body half 202 includes a control button 110, which is used to activate a corresponding switch 210 on the transmitter circuit board 230. The transmitter circuit board 230 also includes a battery 232 and a switch 220. The switch 220 is configured to be activated by the conductive tip 222. In particular, the switch 220 is configured to be activated when the conductive tip 222 is pressed against a body, such as an automobile body. The control signal then flows through the conductive tip 222 and into the body. Thus, the switch 220 and the conductive tip 222 function together as a "switch tip", as that term is used in this application. The switch 220 can be any suitable switch type, such as a suitable push button switch.

It should also be noted that the switch function could be performed by the conductive tip 222 itself. For example, if the conductive tip 222 is configured to make contact with a contact pad on the circuit board 230, the action of pushing the contact tip 222 to contact the contact pad could function as a switch.

The transmitter circuit board 230 also preferably includes two contact pads 234 and 236. These contact pads are located to contact the legs of the conductive tip 222 when the vehicle entry transmitter 100 is assembled. The contact pads 234 and 236 pass the control signal to the conductive tip 222 when the vehicle entry transmitter 100 activated (i.e., the conductive tip 222 is pressed against a body, activating the switch 220). The details of this operation will be described in greater detail later with reference to FIG. 6.

Figure 4:
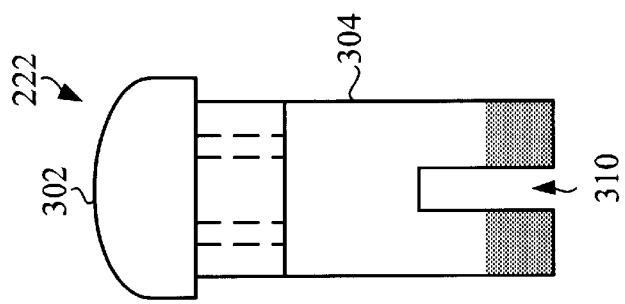
FIG. 4 is a side view of a conformable probe tip in accordance with the preferred embodiment.
Figure 3:
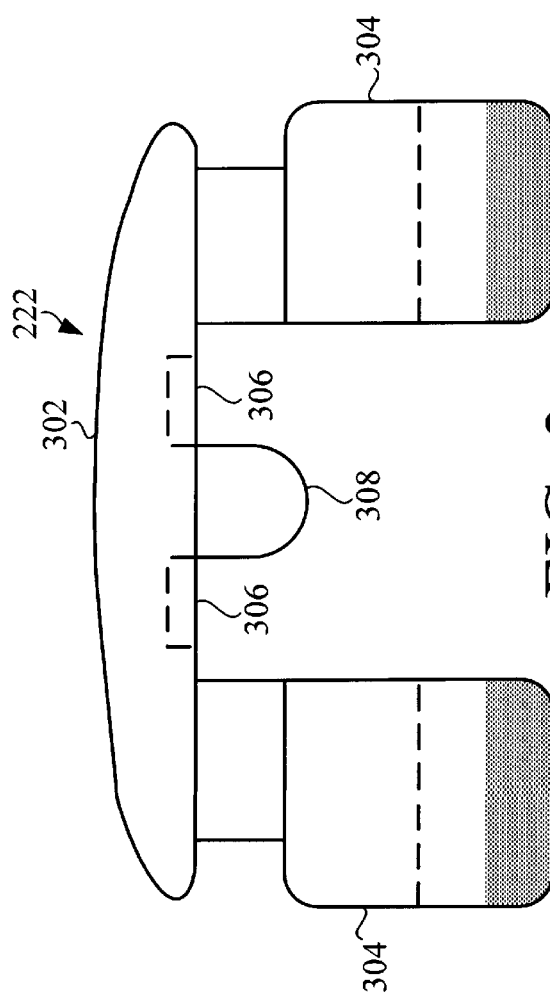
FIG. 3 is a top view of a conformable probe tip in accordance with the preferred embodiment.
Figure 5:
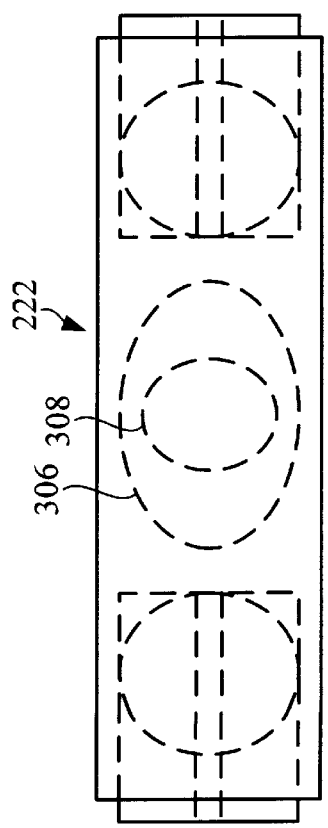
FIG. 5 is a front view of a conformable probe tip in accordance with the preferred embodiment.

Turning now to FIGS. 3, 4 and 5, the preferred embodiment conductive tip 222 is illustrated in more detail. In particular, FIG. 3 shows a top view of the conductive tip 222, FIG. 4 shows a side view, and FIG. 5 shows a front view. The conductive tip 222 is preferably made from a conformable, conductive material that allows the conductive tip 222 to deform when pushed against a body and provide a conduction path to the body. In the most preferred embodiment the conductive tip 220 is made from 60/70 shore hardness neoprene with a resistivity of 0 Meg Ohm at 500 V (i.e., substantially fully conductive). This type of neoprene is typically made conductive by impregnation with a conductive element such as carbon black. Of course, other suitable flexible conductive materials could be used, such as neoprene with different shore hardness, conductive rubber or plastic, etc.

The conductive tip 222 includes an nose 302, and two attachment legs 304. A groove 306 surrounds a protrusion 308 on the back side of nose 302. The groove 306 allows the nose 302 to compress when pushed against the body, allowing the protrusion 308 to contact and activate the switch 220 (not shown in these FIGS.). Each attachment leg 304 includes a channel 310, which is preferably dimensioned to slide over and firmly grip the contact pads on the circuit board 230 (not shown in these FIGS.). This provides a good electrical connection between the conductive tip 220 and the circuit board 230.

The wide flexible nose 302 provides for a good electrical contact between the switch tip and potentially uneven surface such as an automobile body. In particular, when the switch is pressed against the body, the nose 302 deflects and conforms to the body while the protrusion activates the switch 220. Thus, substantially all of the front surface area of the nose comes in contact with the nose. This increases the conductivity of the vehicle/tip contact. Additionally, the increased surface area of contact allows the control signal to capacitively propagate through thin amount of non conductive material such as paint. This allows the vehicle entry transmitter 100 to be used against the painted body of the vehicle, instead of having to locate a bare metal surface on the vehicle.

Figure 6:
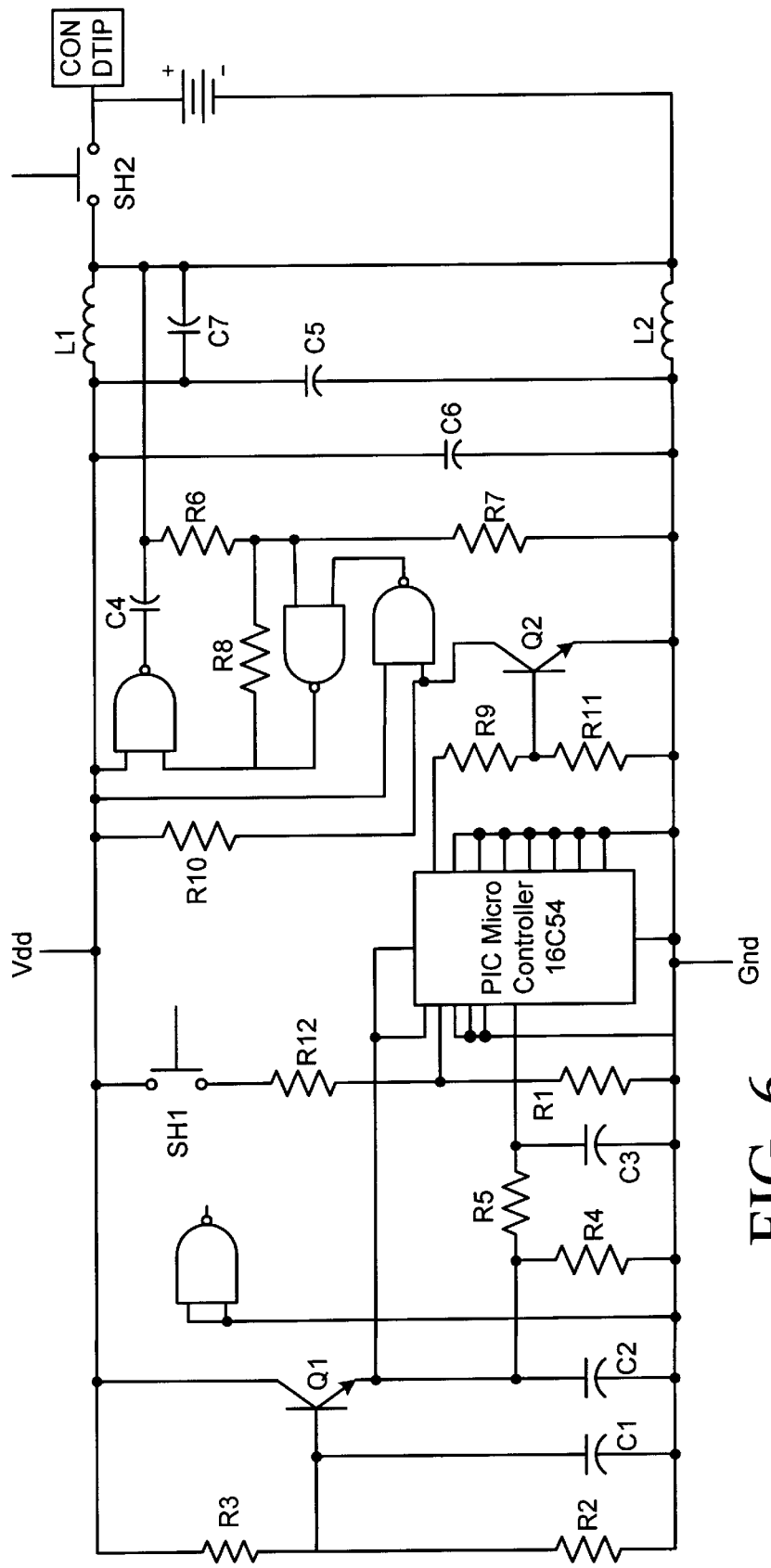
FIG. 6 is a circuit diagram of a preferred embodiment vehicle entry transmitter.

Turning now to FIG. 6, a circuit diagram illustrates a circuit 600 that can be used to control the preferred embodiment vehicle entry transmitter 100. The circuit 600 includes two switches, SH1 and SH2. Switch SH2 corresponds to the switch 220 that is coupled with and electrically connected to the conductive tip 222. Switch SH1 corresponds to the control switch 210 that is used to change the mode of operation of the receiver.

The circuit uses a PIC micro controller to generate a precoded control signal. This signal is then outputted from the PIC through Q2 and the associated circuit back through SH2 to the conductive tip. The signal can then be transmitted to another body, by direct contact or capacitive coupling between the conductive tip and a body providing a conductive path to a receiving circuit. The receiving circuit then performs the operation corresponding to the precoded control signal (e.g., (un)locking the doors, (un)setting an alarm, etc). The switch SH1 in this example is used to provide the PIC micro controller with an input that directs it to output a different control signal. This different control signal can be used to activate an alternative operation. For example, to direct the receiver to unlock the trunk or perform some other function on the automobile.

Thus, when switch SH2 is activated (by pressing the conductive tip 222 against a body), power can flow from battery to the circuit. Because the battery power is only connected when switch SH2 is activated, battery power is conserved. When the battery is connected, the circuit 600 can provide the correct control signal, which will then propagate through the conductive tip and into the body, where it can then propagate to a receiver and cause the desired function to be performed. Because the control codes are transmitted at the same time the power is turned on, the resulting "power spike" will result in increased transmission power, improving the reliability of the transmission.

While FIG. 6 includes a specific embodiment using a specific circuit, those skilled in the art will recognize the preferred embodiment switch tip applies equally to other types of the vehicle entry transmitters that could use significantly different circuit designs.

Thus, the preferred embodiment of the present invention provides an improved vehicle entry transmitter that uses a conductive switch tip. When the switch tip is pressed against a vehicle the switch is activated and the vehicle entry transmitter sends a control signal through the switch tip and into the vehicle, where it can be picked up by a receiver. The receiver can then lock/unlock vehicle doors, turn an alarm on/off, and/or disable/enable the vehicle. In the preferred embodiment, the switch tip comprises a conformable and conductive material. When the switch tip is pressed against a vehicle, the conformable and conductive material deforms until the contact switch is activated, causing a control signal to be propagated through the conformable and conductive tip and into the vehicle.

While the invention has been particularly shown and described with reference to an exemplary embodiment using a specific switch tip design, those skilled in the art will recognize that the preferred embodiment can be applied to other designs that provide a conductive and conformable switch tip.

What is claimed is:

1. A vehicle entry transmitter, the vehicle entry transmitter comprising:

a conformable conductive switch tip, the conformable conductive switch tip activating the vehicle entry transmitter when the conformable conductive switch tip is pressed against a vehicle, and wherein the vehicle entry transmitter passes a control signal to the vehicle through the conformable conductive switch tip when activated and pressed against the vehicle.

2. The vehicle entry transmitter of claim 1 wherein the conformable conductive switch tip comprises conductive neoprene.

3. The vehicle entry transmitter of claim 1 wherein the conformable conductive switch tip comprises a conformal conductive tip and a switch, wherein the conformal conductive tip deflects when pressed against the vehicle and activates the switch.

4. The vehicle entry transmitter of claim 3 wherein the switch is a push button switch.

5. The vehicle entry transmitter of claim 1 further comprising a control switch, wherein the control switch determines the type of the control signal sent to the vehicle.

6. The vehicle entry transmitter of claim 1 wherein the switch tip comprises conformable conductive material having a shore hardness of approximately 60/70.

7. The vehicle entry transmitter of claim 1 wherein the conformable conductive switch tip comprises a nose and two attachment legs formed at the back of the nose, the two attachment legs include grooves configured to attach to contact pads on a circuit board in the vehicle entry transmitter.

8. The vehicle entry transmitter of claim 7 wherein the conformable conductive switch tip additionally comprises a protrusion formed at the back of the nose between the two attachment legs.

9. The vehicle entry transmitter of claim 8 further comprising a groove formed in the back of the nose and around the protrusion to improve the deflection of the nose.

10. A vehicle entry transmitter, the vehicle entry transmitter comprising:

a body;

a transmitter circuit;

a switch tip attached at the front of the body and electrically connected to the transmitter circuit, the switch tip comprising a conformable conductive tip and a switch, wherein the conformable conductive switch tip conforms to the shape of a vehicle when pressed against the vehicle, and wherein the conformable conductive tip deflects when pressed against a vehicle and engages the switch causing the transmitter circuit to activate and pass a control signal through the conformable conductive tip.

11. The vehicle entry transmitter of claim 10 wherein the conformable conductive switch tip comprises conductive neoprene.

12. The vehicle entry transmitter of claim 10 wherein the conformable conductive switch tip comprises conductive rubber.

13. The vehicle entry transmitter of claim 10 wherein the switch is a push button switch.

14. The vehicle entry transmitter of claim 10 wherein the conformable conductive switch tip comprises a nose and two attachment legs formed at the back of the nose, the two attachment legs include grooves configured to attach to contact pads on a circuit board including the transmitter circuit.

15. The vehicle entry transmitter of claim 14 wherein the conformable conductive switch tip additionally comprises a protusion formed at the back of the nose between the two attachment and a groove formed in the back of the nose and around the protrusion to improve the deflection of the nose.

16. The vehicle entry transmitter of claim 10 further comprising a control switch formed at the top of the body, wherein pressing the control switch while pushing the conformable conductive tip results in a different type of control signal being sent to the vehicle through the conformable conductive tip.

* * * * *